(No Model.) 7 Sheets—Sheet 3.
T. WRIGLEY.
COMBINED PRINTER AND INDEX CUTTER.
No. 377,796. Patented Feb. 14, 1888.
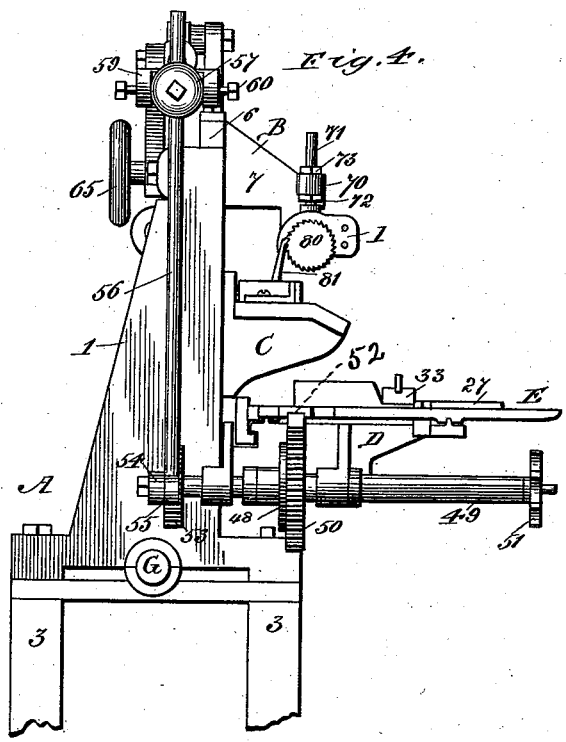
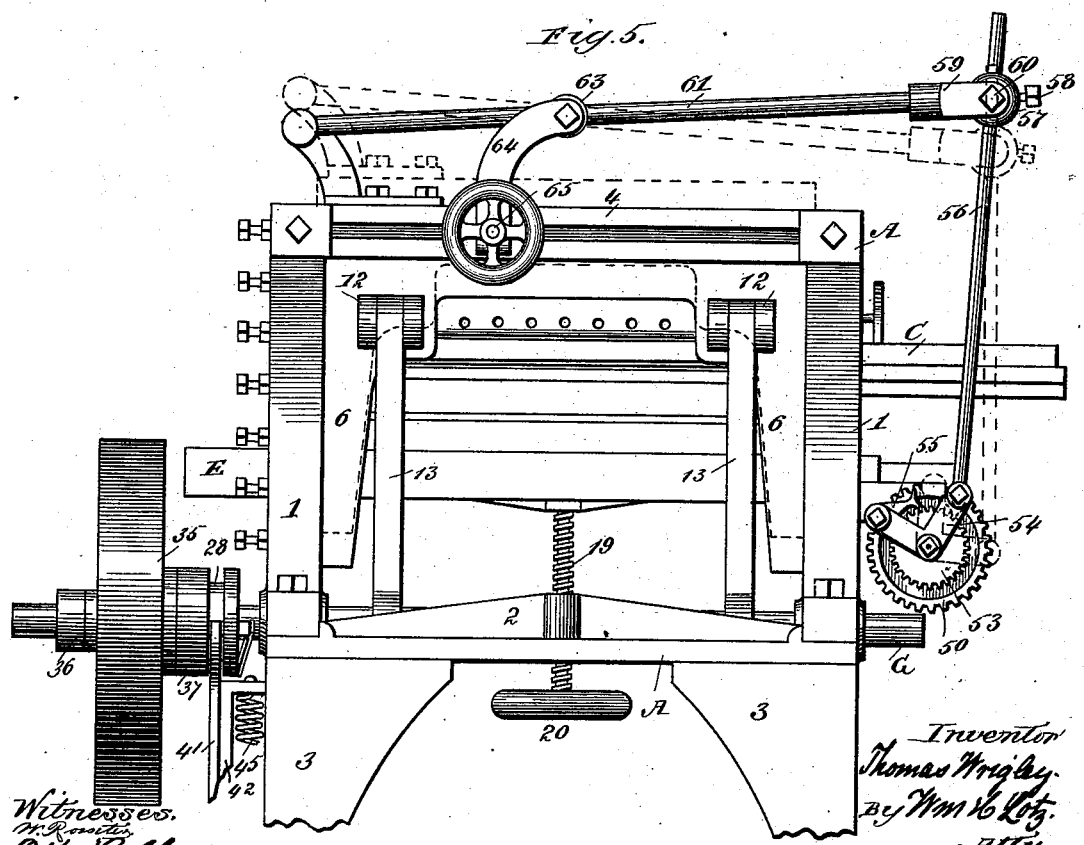
N. PETERS, Photo-Lithographer, Washington, D. C.

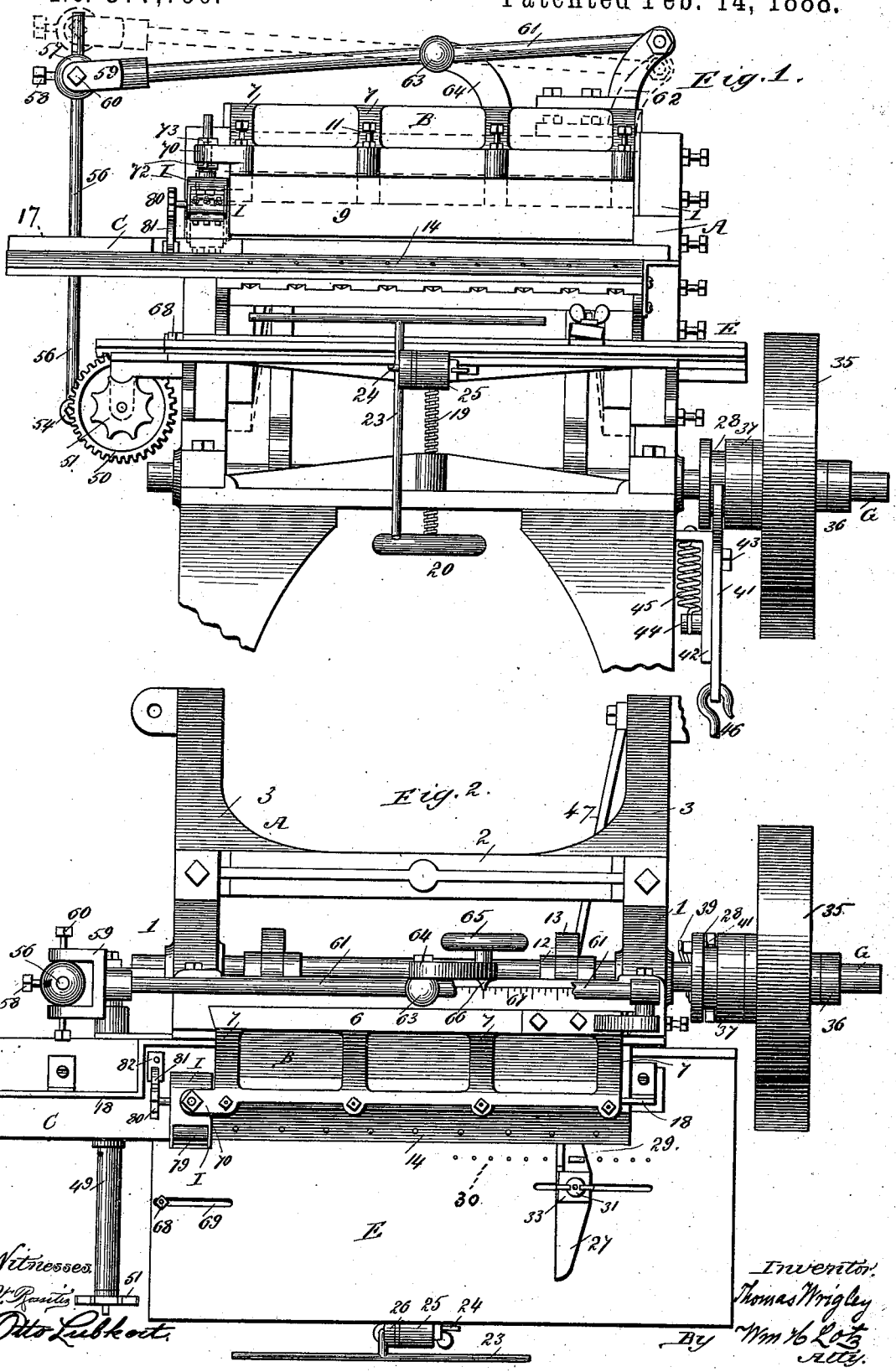

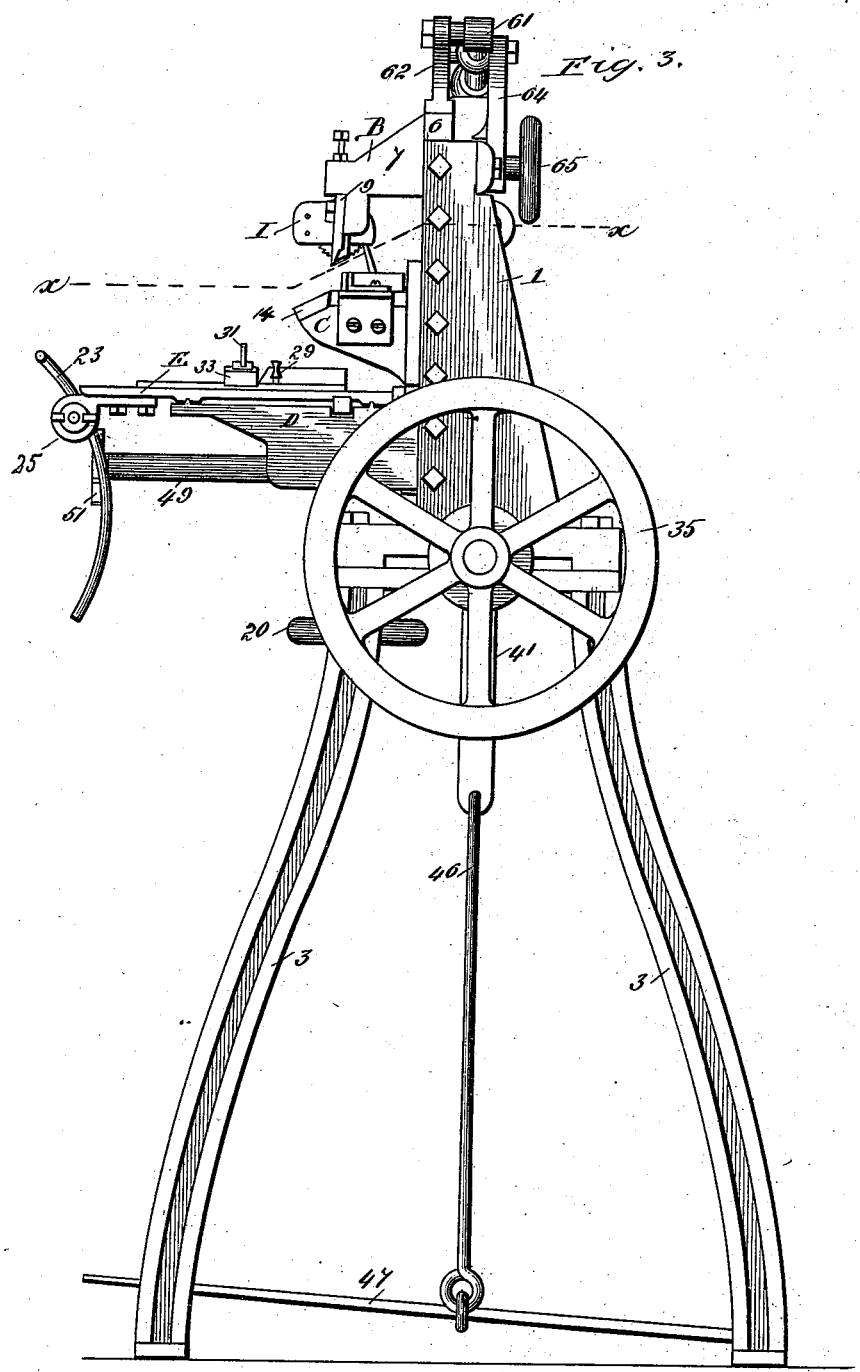

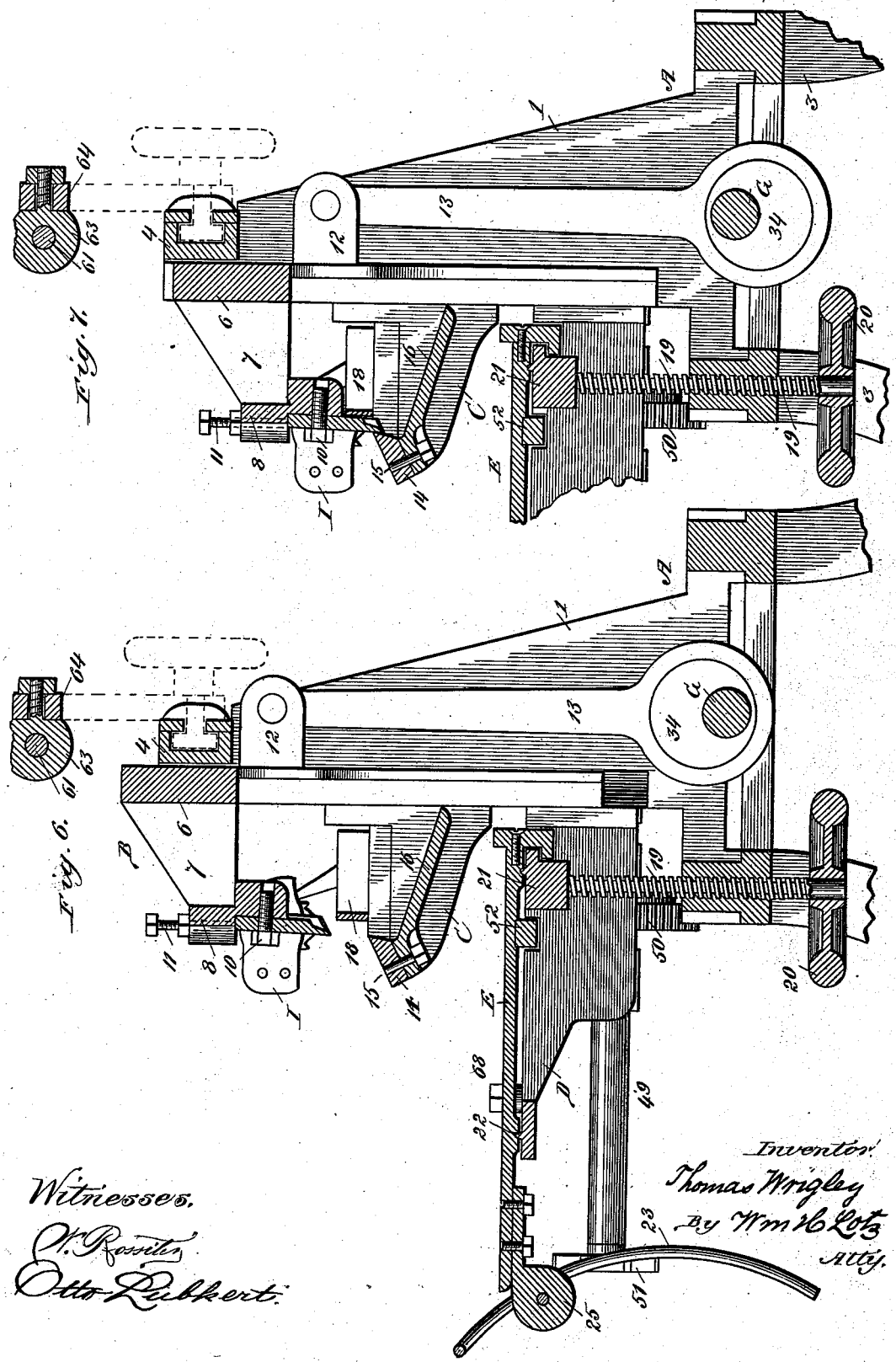

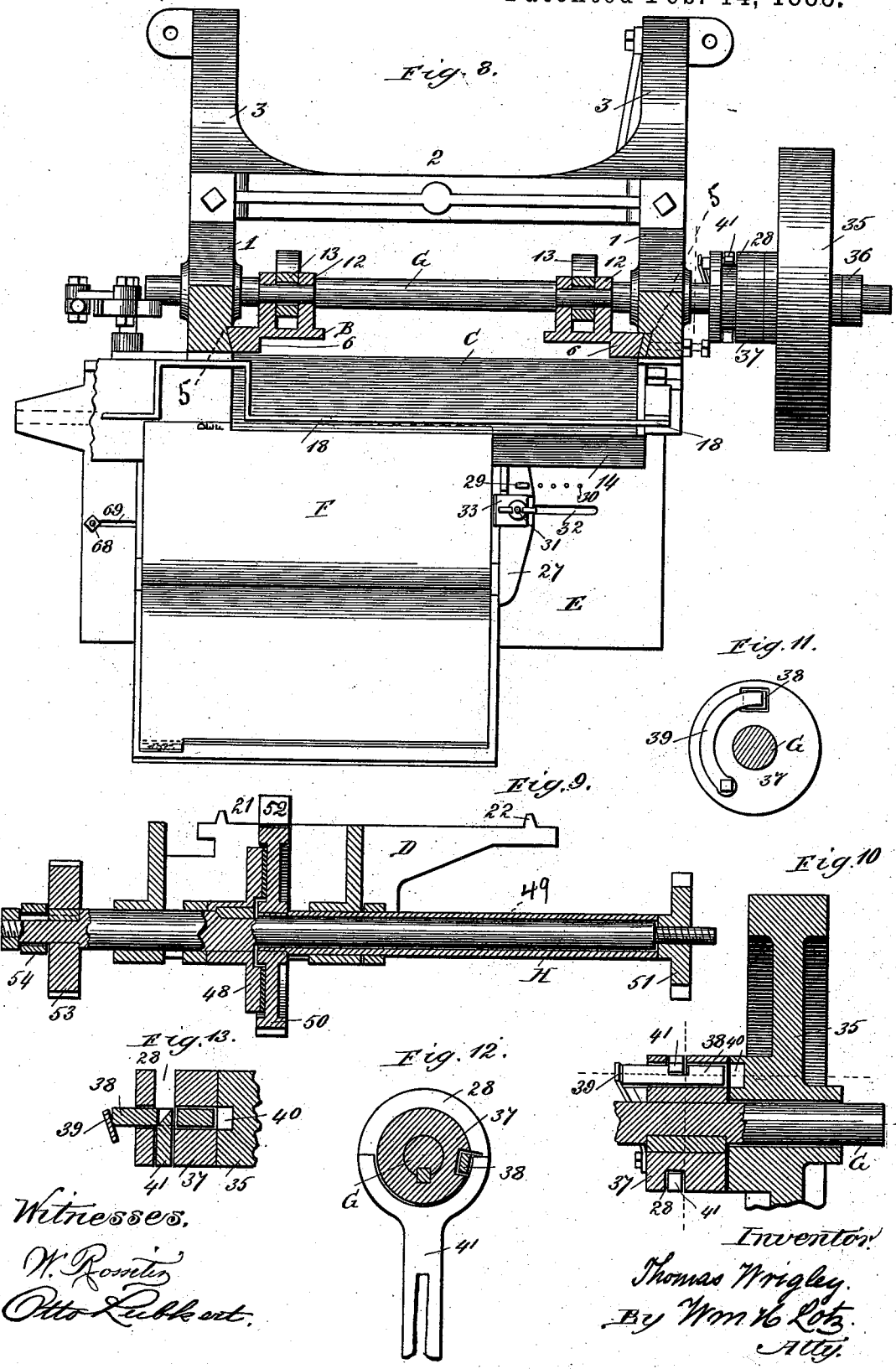

(No Model.) 7 Sheets—Sheet 6.

T. WRIGLEY.
COMBINED PRINTER AND INDEX CUTTER.

No. 377,796. Patented Feb. 14, 1888.

Witnesses.
W. Rossiter
Otto Lubkert

Inventor
Thomas Wrigley
By Wm H. Lotz
Atty.

(No Model.) 7 Sheets—Sheet 7.
T. WRIGLEY.
COMBINED PRINTER AND INDEX CUTTER.
No. 377,796. Patented Feb. 14, 1888.
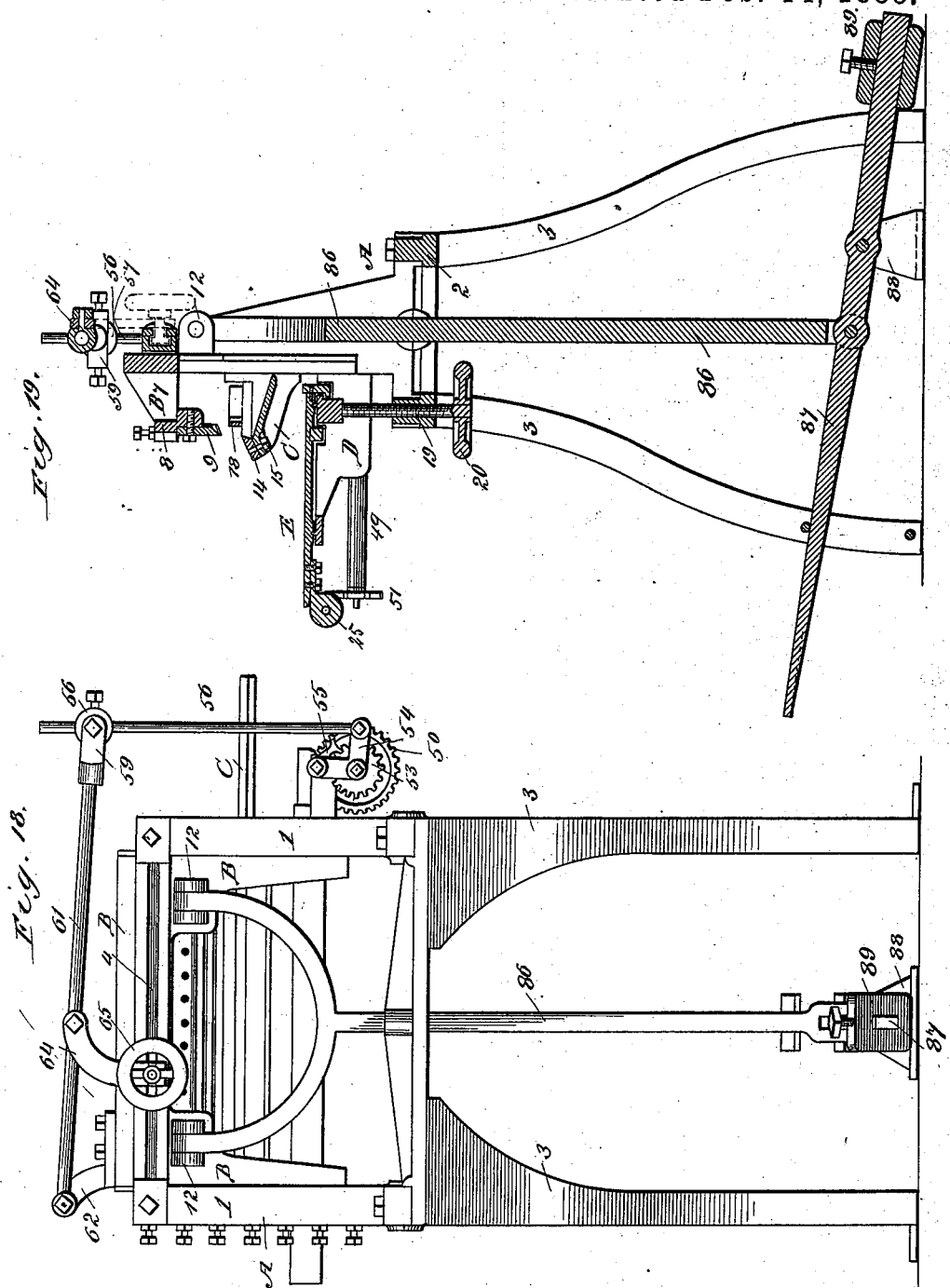
Witnesses.
W. Rossiter.
Otto Lubkert.
Inventor
Thomas Wrigley.
By Wm. H. Lotz
Atty.

UNITED STATES PATENT OFFICE.

THOMAS WRIGLEY, OF OAK PARK, ILLINOIS.

COMBINED PRINTER AND INDEX-CUTTER.

SPECIFICATION forming part of Letters Patent No. 377,796, dated February 14, 1888.

Application filed May 7, 1887. Serial No. 237,494. (No model.)

*To all whom it may concern:*

Be it known that I, THOMAS WRIGLEY, a citizen of the United States of America, residing at Oak Park, in the county of Cook and State of Illinois, have invented certain new and useful Improvements in Index-Cutter and Printer Combined, of which the following is a specification, reference being had therein to the accompanying drawings.

This invention has for its object to provide a machine for simultaneously cutting and printing the index-sheets for blank-books; and for that purpose my invention consists of the novel devices and combinations of devices hereinafter described and specifically claimed.

Figure 14:
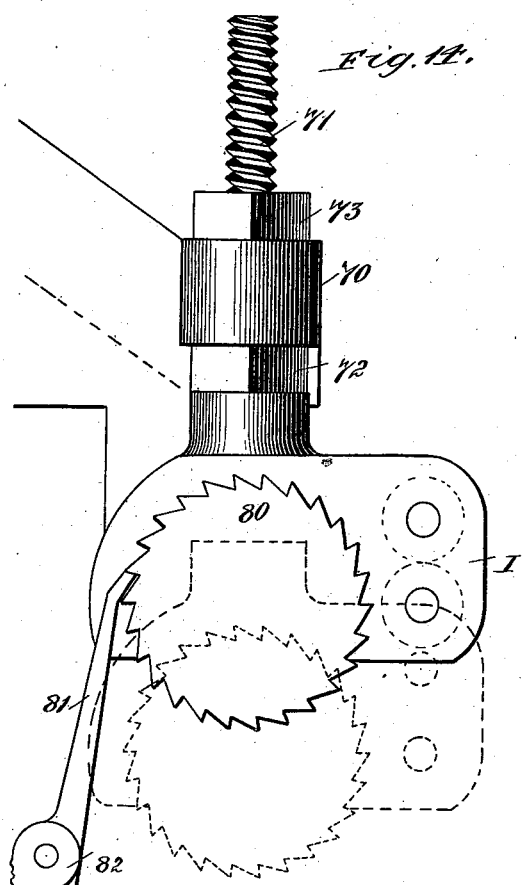
Figure 15:
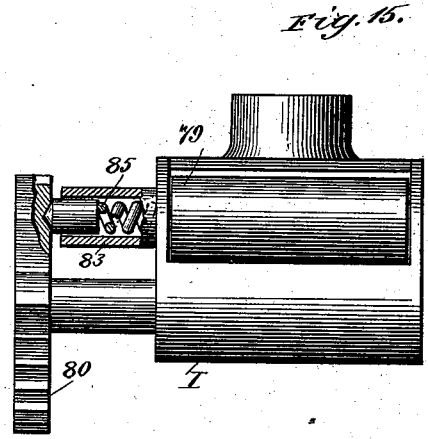
Figure 16:
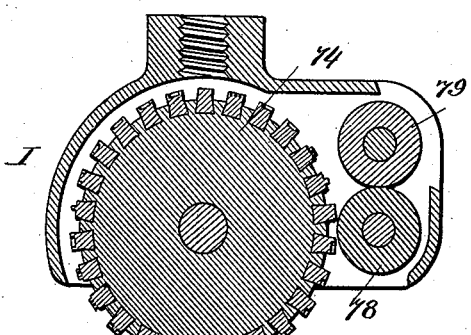
Figure 17:
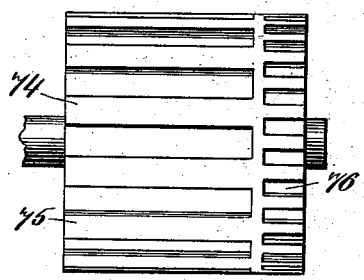

In the accompanying drawings, Figure 1 represents a front elevation, and Fig. 2 a plan view; Figs. 3 and 4, end elevations of opposite sides, and Fig. 5 a rear elevation, of the machine; Figs. 6 and 7, vertical cross-sections through the center of the machine, with its operating parts in different positions. Fig. 8 is a sectional plan on line $x$ $x$ in Fig. 3, Figs. 6, 7, and 8 being drawn to a larger scale than the remaining figures; Fig. 9, a sectional elevation of the table-moving shaft and connecting parts; Figs. 10, 11, 12, and 13, detail views of the driving-wheel coupling mechanism; Fig. 14, a rear elevation; Fig. 15, a sectional end elevation; Fig. 16, a cross-section of the index-printing attachment; Fig. 17, an elevation of the type-holding cylinder, and Figs. 18 and 19 are an elevation and transverse vertical section of the machine modified for operating with the foot.

Corresponding referential characters in the several figures of the drawings designate like parts.

The frame A of the machine consists of two triangular-shaped standards, 1, secured upon the ends of a rectangular frame, 2, that is supported on legs 3. On top the standards 1 are connected by a longitudinal T-grooved beam, 4. The forward inner faces of standards 1 have planed angular grooves 5, that form dovetailed guides for a vertically-sliding cutter-frame, B, consisting of a U-shaped plate, 6, having connected by forwardly-projecting ribs 7 a bar, 8, with a shouldered face for securing knife-plate 9 by screws 10, and with bosses at the top of such knife for adjusting-screws 11. Near its ends the plate 6 is provided with eye-lugs 12, for pivotally coupling the ends of eccentric-rods 13. The angular grooves 5 are provided with liner-strips held in close contact with the guide-edges of plate 6 by set-screws tapped through standards 1, for taking up lost motion from wear and tear.

Below the cutter-frame B is secured against standards 1 of frame A a shelf-piece, C, that upon its forward angular face has secured the lower knife, 14, by screws 15, in a manner that the edges of both knives 9 and 14 will pass each other in close contact, and will thus form shearing-cutters. Behind knife 14 the shelf-piece C has an inclined plane, 16, that will discharge all paper-cuttings toward the rear. This shelf-piece C extends toward the left a sufficient distance for affording an efficient support for a book-leaf while printing index-letters too near the upper edge thereof, and at its left end and below the printing attachment the shelf-piece C is provided with upwardly-protuberant faces 17, that are on about a horizontal line with the cutting-edge of knife 14. Upon this shelf-piece C is secured the gage-bar 18, so shaped that it will clear the index-printing attachment.

Below shelf-piece C is secured, against the front face of standards of frame A, a bracket-frame, D, being vertically adjustable by means of a screw, 19, tapped through the front bar of frame 2, and provided with a hand-wheel, 20, for turning it. This bracket-frame D has guide-strips 21 and 22 for a horizontal table, E, reciprocating thereon, upon which table the blank-book F to be indexed is placed in an open condition, so as to afford the turning the leaves one by one upon the knife 14, and with their edges against gage-bar 18, as shown in Fig. 8; and for the purpose of supporting the forwardly-open portion of the book in a somewhat inclined position, that will be more handy for turning the leaves thereof, it is rested upon a T-shaped bar, 23, having its main leg curved and passed through the eyed head of a bolt, 24, secured in the eyed end of a bracket, 25, that is secured under the forward edge of such table E, and a washer, 26, that is grooved in its face for embedding therein one-half of the periphery of bar 23, is interposed between the head of bolt 24 and the end of bracket 25, for providing a better clamping-surface. By loosening the thumb-nut of bolt 24 the T-shaped bar 23 can be shifted or turned to the desired position, and then by tightening the thumb-nut again the bar 23 will be held rigid.

The rearwardly-placed front cover of the book F to be indexed is placed with its upper edge against a gage-bar, 27, adjustably secured upon the table E by a pin, 29, passed through the gage-bar and inserted into any one of a series of holes, 30, drilled through such table, and by a bolt, 31, having a thumb-nut, and also passed through the gage-bar and through a longitudinal slot, 32, of such table, which bolt 31 depresses a clamp-plate, 33, projecting over the edge of the book-cover for securing the book rigidly to the table while indexing the same.

In suitable boxes in the ends of frame A is journaled the main driving-shaft G, having mounted eccentrics 34, that form the bearings for the eyed ends of eccentric-rods 13, by which the cutter-frame B is vertically reciprocated. Upon the overhanging end of this shaft G is loosely mounted the driving-pulley 35, being held from lateral movement by two collars, 36 and 37, the former being secured by a set-screw and the latter one being keyed upon the shaft, so as to be rigid therewith. This collar 37 is perforated longitudinally for a square bolt, 38, pushed toward the pulley 35 by a leaf-spring, 39, secured against the end of collar 37. The end of this bolt 38 engages the shoulder of a socket, 40, formed in the face of the hub of pulley 35, for coupling the shaft with such pulley; but this only being desirable after a leaf is adjusted, the bolt 38 is held clear of the socket until the operator is ready, and then the shaft is only to rotate a single revolution, when it is to stop again with the knives, &c., in proper position for the next book-leaf to be adjusted between. This I accomplish by turning an annular groove, 28, into the periphery of collar 37 and by cutting an angular or inclined notch in bolt 38, that is in line with the annular groove 28, while the bolt is retracted. A fork, 41, is guided against a rectangular bracket, 42, secured to the end of the frame on a screw, 43, passed through a vertical slot in fork 41 and tapped with its point into the bracket 42, and by a stud, 44, secured to fork 41 and passed through a slot in the bracket 42. A spiral spring, 45, secured between stud 44 and the upper end of bracket 42, will yieldingly hold the fork 41 on its upper position in the groove 40 of collar 37, and one prong of this fork being chamfered in conformity with the angular notch of bolt 38, it will engage such notch and will retract the bolt to be out of contact with the hub of pulley 35. The fork 41 being connected by a rod, 46, with the middle portion of a pedal, 47, pivoted at one end to one of the legs 3, a depression of such pedal with the foot of the operator will pull the fork 41 downward sufficiently to release the bolt 38, which then will be pushed by spring 45 into contact with the hub of pulley 35, to engage with socket 40; but as soon as the operator releases the pedal again the spring 45 will lift the fork 41, when its prong will engage the notch of the bolt and will redraw the same. With this arrangement the pedal needs to be depressed only sufficiently long for the bolt to engage the pulley, and then it is to be released again, whereby the shaft will be rotated only a single but entire revolution before it will stop again.

To the end opposite the driving-pulley is pivoted in suitable hangers secured to or forming part of bracket-frame D a transverse shaft, H, having rigidly mounted a disk, 48, and upon one end of a sleeve, 49, loosely placed over such shaft, is rigidly mounted a spur-wheel, 50. The other end of the sleeve 49 extends to near one end of shaft H, which shaft end is screw-threaded for a nut-wheel, 51, that with tightening will press against sleeve 49, and will thereby force the spur-wheel 50 against the disk 48, which, being lined with leather, rubber, or other suitable material for frictional adhesion, will make the wheel 50 rotate with the shaft, while with loosening the nut-wheel 51 the wheel 50 will remain idle while such shaft H is rotated. The teeth of spur-wheel 50 mesh with the teeth of a rack-bar, 52, secured to the under side of table E. Upon the opposite end of shaft H is mounted a toothed wheel, 53, and exteriorly of it is loosely sleeved on such shaft the hub of a bell-crank, 54, carrying on its vertical arm a reversible pawl, 55, that engages the teeth of the wheel 53. The horizontal arm of this bell-crank has coupled the eyed end of a rod, 56, the opposite end of which rod is passed through the central hole of a swivel-head, 57, and is adjustably secured therein by a set-screw, 58. This swivel-head 57 is pivotally secured in the bifurcated head 59 between pointed set-screws 60, and the head 59 is secured upon one end of a rocker-bar, 61, pivotally connected with its opposite end to a standard-bracket, 62, secured upon the top of plate 6 of cutter-frame B, so as to vertically reciprocate therewith. The intermediate portion of bar 61 is passed through the central hole of a head, 63, having a trunnion that is pivoted in the upper end of a standard-bracket, 64, adjustably secured against the rear face of beam 4 of frame A by a bolt the head of which slides in the T-groove of beam 4, and by a hand-wheel, 65, forming the clamping-nut. By this device the bracket 64 can be longitudinally shifted to occupy any position for transmitting the desired angle of vibration to bell-crank 54, and thereby the required angle of rotation to the shaft H, that will move the table E the desired distance with each upward movement of cutter-frame B; and for the purpose of ready adjustment of bracket 64, I provide said bracket with a pointer, 66, and upon the top of beam 4 of frame A, I secure a graduated plate, 67, that for any position of bracket 64 will indicate the distance of movement of table E. With this device the table E is shifted intermittently from the right to the left the proper distance for each index cut until the book is completed, when for placing thereon another book to be indexed the wheel-nut 51 is loosened, and then the table is shifted back to the desired position, determined by shoulder-pin 68, adjustably secured in the slot 69 of table E, and now, after another blank-book, F, has been placed and secured upon such table the nut 51 is tightened again.

The bar 8 of cutter-frame B has extension-bracket 70, vertically slotted for the screw-shank 71 of the index-printer frame I, adjustably secured therein by two nuts, 72 and 73. This frame I is formed as a shell, into which is pivoted a cylindrical roller, 74, provided with longitudinal dovetailed grooves 75 and 76, for inserting the types 77, the grooves 75 being for larger type and the grooves 76 for smaller type; and parallel with such roller 74 is pivoted an inking-roller, 78, that will contact with the type as they pass by, and over this roller 78 is pivoted another inking-roller, 79, to be in contact therewith, to which the printing-ink is applied and which will transmit such ink to roller 78, both these inking-rollers being rotated by the frictional contact with the type. Upon the protruding end of the shaft of roller 74 is rigidly mounted a ratchet-wheel, 80, the teeth of which, with the vertical reciprocation of the printing apparatus moving with the cutter-frame B, will engage with a pawl, 81, pivoted in a bracket, 82, secured upon shelf-piece C, turning such ratchet-wheel 80 and roller 74 a just sufficient portion of a revolution to bring the type in successive order one by one to the proper position for printing the required letters, and for the purpose of steadying such roller 74 on the acquired position conical sockets are cut in the rear face of ratchet-wheel 80, one for each type-groove of roller 74, and in a socket-piece, 83, of the casing is inserted a conically-pointed plug, 84, pushed outward and into engagement with the conical sockets of the ratchet-wheel 80 by a spring, 85.

This printing apparatus will thus be self-inking, and will automatically adjust itself to print the different index-letters simultaneously with cutting the notches in the index-sheets.

For driving the machine by foot-power the shaft G, with its mountings, can be omitted, when, in place of the eccentric-rods 13, the bifurcated end of a rod, 86, is pivotally secured to the lugs 12 of cutter-frame B, and the lower end of this rod 86 is connected with a foot-lever, 87, pivoted in a floor-bracket, 88, and counterbalanced by a weight, 89, all as shown by Figs. 18 and 19.

The *modus operandi* of the machine is as follows, to wit: The gage-bars and other parts of the machine being properly adjusted for the size of books to be indexed, one of the books is placed on table E, is turned open upon bar 23, and is secured upon such table by fastening the clamp-plate 31 upon the edge of the cover. Then after turning one or more leaves, according to the number of index blank sheets desired for each letter, upon shelf-piece C over knife 14, and with its edge against the gage-plate, the operator depresses lever 47, whereby the shaft G will be coupled to the pulley to make one revolution therewith, drawing the cutter-frame B down and raising it to its upper position again. The knife when moving down will cut away a portion of the edge of the sheet, and the type-roller 74 will at the same time print the index letter or letters upon the end of the remaining edge of the sheet close to the cut-away portion thereof, and as the cutter moves up again the rocker-bar 61 will operate the pawl 55 to turn shaft H, when wheel 50 will move the table the desired distance for cutting from the edge of the next index-sheet placed between the knives a strip sufficiently longer for exposing the index-letters of the former sheet when folded thereupon, and so on until all the index-sheets of the book are thus cut and printed, the changing of the type for printing the index-letters in successive order being automatical, as already explained. After an index is thus completed the nut 51 is loosened, the table E is shifted as far as the stop 68 will permit, and another book is fastened to pass through the same operation.

What I claim is—

1. In a machine of the kind described, the combination, with the vertically-reciprocating knife, of a stationary knife extended in front of the reciprocating knife and presenting an edge for the reciprocating knife to shear against on the leaf side of the work, and at the same time the face of the stationary knife forming a support for the leaf, and a vertically-adjustable work-supporting table in front of the stationary knife, as set forth.

2. In a machine of the variety described, the combination of the vertically-adjustable bracket-frame D, having screws 19, for adjusting it, a table, E, sliding on said frame D, and a T-bar, 23, having a curved stem adjustable vertically on the edge of said table, as set forth.

3. In a machine for the purpose described, the combination of the sliding table E, provided with a series of holes, 30, a gage-bar, 27, having pin 29, for engagement with holes 30, to set the bar upon the table, and a clamp-plate, 33, as and for the purpose described.

4. In a machine for the purpose described, the combination, with the shelf-piece C, having an upwardly-projecting pawl, 81, a lower stationary knife held on said shelf-piece, a vertically-reciprocating knife and the frame in which it is held, a printing-cylinder secured on the reciprocating-knife frame, and a ratchet-wheel, by means of which the printing-cylinder is turned before reaching its lowest position by contact with the pawl, as set forth.

5. In a machine for the purpose described, the combination of the shearing and printing devices and shaft for operating them, with a loose pulley, 35, mounted on said shaft, a collar fixed upon the shaft beside said pulley, a pin or bolt, 38, passed loosely through the collar, and a spring, 39, for keeping said pin or bolt normally disengaged from the pulley, and a fork, 41, under control of the operator, for causing the pin or bolt to engage the pulley when desired, as set forth.

6. In a machine for the purpose described, the combination, with the shearing and cutting devices and adjustable work-holding table having a rack-bar, as described, of the gear-wheel 50, for feeding said table for longitudinal adjustment, a bell-crank pawl, 54 55, operating upon the gear 50, a rod, 56, connected to the pawl, a vibrating bar, 61, connected to the rod 56 at one end and to a portion of the reciprocating frame at the other, and a fulcrum for said bar, consisting of a horizontally-adjustable bracket, 64, held in a groove in the machine-frame, and provided with means for setting it at different positions, as set forth.

7. In a machine for the purpose described, a frame, I, open on its under side and at one upper corner, a type-holding cylinder, 74, held in the frame and projecting below the open lower edge of the frame in wheels 78 and 79, the latter revolving in front of the corner opening, a ratchet-wheel, 80, on end of type-cylinder, and a pawl, 81, on the stationary bed, whereby the type-cylinder is operated in its descent, as set forth.

8. In a machine for the purpose described, the combination of the frame I, type-cylinder 74, carried in frame I, ratchet-wheel 80 on the type-cylinder shaft, having conical sockets, a socket, 83, projecting from frame I, a plug, 84, in socket 83, and a spring in socket 83 back of plug, said plug having a conical end, as and for the purpose set forth.

In testimony whereof I affix my signature in presence of two witnesses.

THOMAS WRIGLEY.

Witnesses:
WILLIAM H. LOTZ,
OTTO LUBKERT.